(No Model.)

J. H. ROMKEY.
HARROW.

No. 279,437. Patented June 12, 1883.

WITNESSES
F. L. Arnaud
Wm. A. Garner

INVENTOR
John H. Romkey
per L. Deane.
his Attorney

UNITED STATES PATENT OFFICE.

JOHN H. ROMKEY, OF BURLINGTON, IOWA.

HARROW.

SPECIFICATION forming part of Letters Patent No. 279,437, dated June 12, 1883.

Application filed April 22, 1882. (No model.)

*To all whom it may concern:*

Be it known that I, JOHN H. ROMKEY, a citizen of the United States, residing at Burlington, in the county of Des Moines and State of Iowa, have invented a new and useful Improvement in Harrows, of which the following is a specification.

This invention relates to that class of harrows in which the bars are adapted to fold or move the one on the other; and the novelty consists in so securing the two together by means of teeth screw-threaded on the upper ends that while one bar is held firm the other will be allowed all needed movement. The bars of the harrow are preferably of metal.

Figure 1:
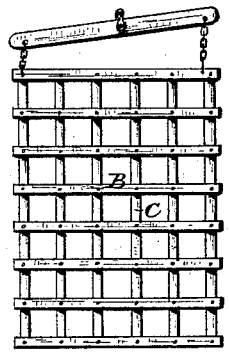
Figure 2:
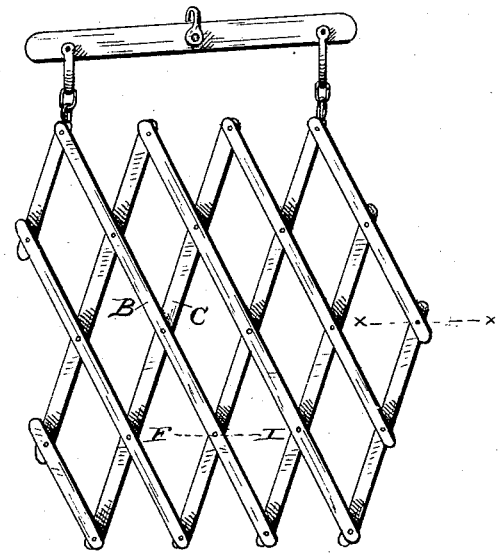
Figure 3:
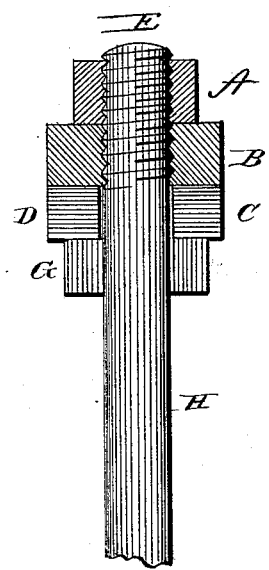

Figure 1 is a top view of a section of a harrow having the upper bars crossing the lower bars at right angles, and upon which I desire to use my improvements. Fig. 2 is a top view of a section of a harrow having the upper bars crossing the lower bars at acute angles, and upon which I also desire to use my improvements. Fig. 3 is a vertical sectional view of my improvement, taken through the line $x\ x$ in Figs. 1 and 2 of said drawings.

Similar letters refer to similar parts throughout the several views.

A tooth is placed in each crossing or intersection of the bars B C, (see Figs. 1 and 2,) through holes formed for that purpose. The holes in the lower bars are formed of such a size that the shanks E of the teeth H shall pass therein easily; but the holes in the upper bars, B, are smaller than the diameter of said shanks. Said holes also have screw-threads formed in them, said threads being of the same size as the threads formed upon the shanks of the teeth, which shanks said holes are to receive. Screw-threads are also formed upon the shanks E of the teeth H to within a short distance above the shoulders G of the teeth H, which shoulders are formed square or hexagonal, in order that a wrench may be applied thereto.

Having the bars and the teeth finished as above described, I lay the bars B C across each other, as in Figs. 1 and 2. I then insert the shanks E of the teeth H through the holes of the lower bars, C, and with a wrench I turn or screw said shanks into the holes formed in the upper bars, B, until the bars C are clamped firmly between the bars B and the shoulders G of the aforesaid teeth. I then place upon the shanks E the nuts A. It will be observed that the tooth must be held with a wrench in order that it will not turn out while putting on the nut A. After said nut is set securely upon the bars B, I give the nuts an extra turn. I do this in order to lock said nut against the bars B, forming what is known as a "lock-nut" or "nut-lock." This makes it impossible for the tooth to turn or the nut to come off, or even to become loose in working in the field or in handling.

When using my improvement for or upon an adjustable harrow-frame, I proceed as above described, but do not clamp the bars C tight between the bars B and shoulders G, but leave a small space between the bars B and C, as shown at D in Fig. 3 of the accompanying drawings. Said space can be increased or diminished, as desired, or as the unevenness or roughness of the bars may require. This space is left between the bars so that the frame of the harrow can be drawn apart or pressed together without friction between the bars B C. In this case the nuts A are locked upon the bars B the same as when used for a rigid or solid frame harrow. (See Fig. 3.)

Having thus described my invention, what I claim as new, and desire to secure by Letters Patent, is—

In an extensible and folding harrow, the upper bar, B, having screw-threaded apertures for the shanks of the teeth, and the lower bar, C, having apertures of a larger diameter than the teeth-shanks, combined with the teeth H, each having shoulder G, and screw-threaded shank E, and nut A, whereby the upper bar is secured tightly on the tooth-shank while the lower bar is allowed free movement, substantially as described.

JOHN H. ROMKEY.

Witnesses:
A. F. HEITZLER,
T. B. SNYDER.